US011854399B2

(12) United States Patent
Cho

(10) Patent No.: US 11,854,399 B2
(45) Date of Patent: Dec. 26, 2023

(54) SYSTEM FOR CONTROLLING VEHICLE DRIVING THROUGH ROUNDABOUT AND METHOD OF CONTROLLING THE SAME

(71) Applicant: HYUNDAI MOBIS CO., LTD., Seoul (KR)

(72) Inventor: Chang Ho Cho, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 283 days.

(21) Appl. No.: 17/515,820

(22) Filed: Nov. 1, 2021

(65) Prior Publication Data

US 2022/0165159 A1  May 26, 2022

(30) Foreign Application Priority Data

Nov. 20, 2020 (KR) .......................... 10-2020-0156721

(51) Int. Cl.
*G08G 1/16* (2006.01)
*B60W 60/00* (2020.01)
*B60W 30/095* (2012.01)

(52) U.S. Cl.
CPC ......... *G08G 1/163* (2013.01); *B60W 30/0953* (2013.01); *B60W 30/0956* (2013.01); *B60W 60/0015* (2020.02); *B60W 2554/4041* (2020.02)

(58) Field of Classification Search
CPC .............. G08G 1/163; B60W 30/0956; B60W 60/0015; B60W 2554/4041
See application file for complete search history.

(56) References Cited

U.S. PATENT DOCUMENTS

| 11,004,336 | B2 * | 5/2021 | Choi ................ G08G 1/096775 |
| 2019/0001993 | A1 * | 1/2019 | Visintainer ............ G01C 21/30 |
| 2020/0074863 | A1 | 3/2020 | Jung et al. |
| 2020/0110418 | A1 | 4/2020 | Lee |

(Continued)

FOREIGN PATENT DOCUMENTS

KR   10-2020-0008482 A   1/2020

OTHER PUBLICATIONS

Banjanovic-Mehmedovic et al., "Autonomous Vehicle-to-Vehicle (V2V) Decision Making in Roundabout using Game Theory", "International Journal of Advanced Computer Science and Applications", West Yorkshire vol. 7, Iss. 8, (2016). DOI:10.14569/IJACSA.2016.070840 (Year: 2016).*

(Continued)

*Primary Examiner* — Tarek Elarabi
(74) *Attorney, Agent, or Firm* — NSIP Law

(57) ABSTRACT

A system with control of vehicle driving through a roundabout includes: a position recognizer configured to recognize that a host vehicle is traveling around the roundabout; a front sensor disposed at a front of the host vehicle and configured to sense a vehicle that possibly enters the roundabout while the host vehicle is traveling around the roundabout; a rear sensor disposed at a rear of the host vehicle and configured to recognize a vehicle following the host vehicle while the host vehicle is traveling around the roundabout; a controller configured to calculate a possible entry time of the vehicle that possibly enters the roundabout, using information sensed by the rear sensor; and a communicator configured to provide the calculated possible entry time to the vehicle that possibly enters the roundabout.

11 Claims, 3 Drawing Sheets

(56) References Cited

U.S. PATENT DOCUMENTS

2020/0160704 A1* 5/2020 Choi ................ G08G 1/096716
2020/0211379 A1   7/2020 Quijano
2020/0272159 A1   8/2020 Zhang et al.

OTHER PUBLICATIONS

Extended European Search Report dated Apr. 20, 2022 in counterpart European Patent Application No. 21208304.2 (7 pages in English).

* cited by examiner

SYSTEM FOR CONTROLLING VEHICLE DRIVING THROUGH ROUNDABOUT AND METHOD OF CONTROLLING THE SAME

CROSS-REFERENCE TO RELATED APPLICATIONS

This application claims the benefit under 35 U.S.C. § 119(a) of Korean Patent Application No. 10-2020-0156721, filed on Nov. 20, 2020 in the Korean Intellectual Property Office, the entire disclosure of which is incorporated herein by reference for all purposes.

BACKGROUND

1. Field

The present invention relates to a technology for controlling vehicle driving through a roundabout, and more specifically, to a technology applicable to autonomous vehicles.

2. Description of the Related Art

Autonomous vehicles aim to understand surrounding situations and road situations by themselves, set an appropriate driving path according thereto and automatically travel along the set path without driver intervention.

Although autonomous driving can be realized relatively easily and safely on straight roads or gently winding roads, there is a possibility of collision between a vehicle traveling around a roundabout and a vehicle newly entering the roundabout.

Particularly, when an autonomous vehicle that intends to enter a roundabout determines an entry time, it is very difficult to determine a safe entry time if additional infrastructure for guiding a time of entry to a roundabout is not constructed because it is difficult to sense a vehicle following a vehicle that is traveling toward a point to which the autonomous vehicle will travel.

For reference, autonomous vehicles should be construed as including vehicles that require partial driver intervention as well as vehicles without driver intervention according to levels thereof, and a "vehicle" described hereinafter should be construed as referring to any vehicle having the above-described autonomous driving technologies of various levels.

It will be understood that the above matters described in the related art are merely for promotion of understanding of the background of the invention and should not be recognized as prior art well-known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system with control of vehicle driving through a roundabout includes: a position recognizer configured to recognize that a host vehicle is traveling around the roundabout; a front sensor disposed at a front of the host vehicle and configured to sense a vehicle that possibly enters the roundabout while the host vehicle is traveling around the roundabout; a rear sensor disposed at a rear of the host vehicle and configured to recognize a vehicle following the host vehicle while the host vehicle is traveling around the roundabout; a controller configured to calculate a possible entry time of the vehicle that possibly enters the roundabout, using information sensed by the rear sensor; and a communicator configured to provide the calculated possible entry time to the vehicle that possibly enters the roundabout.

The system may further include a warning device configured to warn the vehicle that possibly enters the roundabout. The controller may be further configured to drive the warning device to warn the vehicle that possibly enters the roundabout about danger of entry, in response to the front sensor sensing entry of the vehicle into the roundabout before the possible entry time.

The controller may be further configured to determine, as the possible entry time, a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point.

The controller may be further configured to determine the possible entry time by adding a first weight proportional to a radius of the roundabout to a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point.

The controller may be further configured to determine the possible entry time by adding a second weight according to a weather condition of the roundabout to the first weight.

In another general aspect, a method with control of a system for controlling vehicle driving through a roundabout includes: determining whether a host vehicle is traveling around the roundabout; determining whether there is a vehicle that possibly enters the roundabout in front of the host vehicle while the host vehicle is traveling around the roundabout; sensing a vehicle following the host vehicle while the host vehicle is traveling around the roundabout; calculating a possible entry time of the vehicle that possibly enters the roundabout using information on the vehicle following the host vehicle; and providing the calculated possible entry time to the vehicle that possibly enters the roundabout.

The determining of whether the host vehicle is traveling around the roundabout may include determining that the host vehicle is traveling around the roundabout, in response to determining that GPS position information on the host vehicle indicates that the host vehicle is located at the roundabout on a navigation map using GPS information and navigation map information of the host vehicle.

The method may further include warning the vehicle that possibly enters the roundabout about danger of entry, in response to sensing entry of the vehicle to the roundabout before the calculated possible entry time.

The warning of the vehicle may include warning about the danger of entry using any one or any combination of any two or more of a visual warning device, an auditory warning device, and a vehicle-to-vehicle communication device.

The calculating of the possible entry time may include determining, as the possible entry time, a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point.

The calculating of the possible entry time may include determining the possible entry time by adding a first weight proportional to a radius of the roundabout to a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point.

The calculating of the possible entry time comprises determining the possible entry time by adding a first weight proportional to a radius of the roundabout and a second weight according to a weather condition of the roundabout to a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point.

In another general aspect, a non-transitory computer-readable storage medium stores instructions that, when executed by a processor, cause the processor to perform the method described above.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
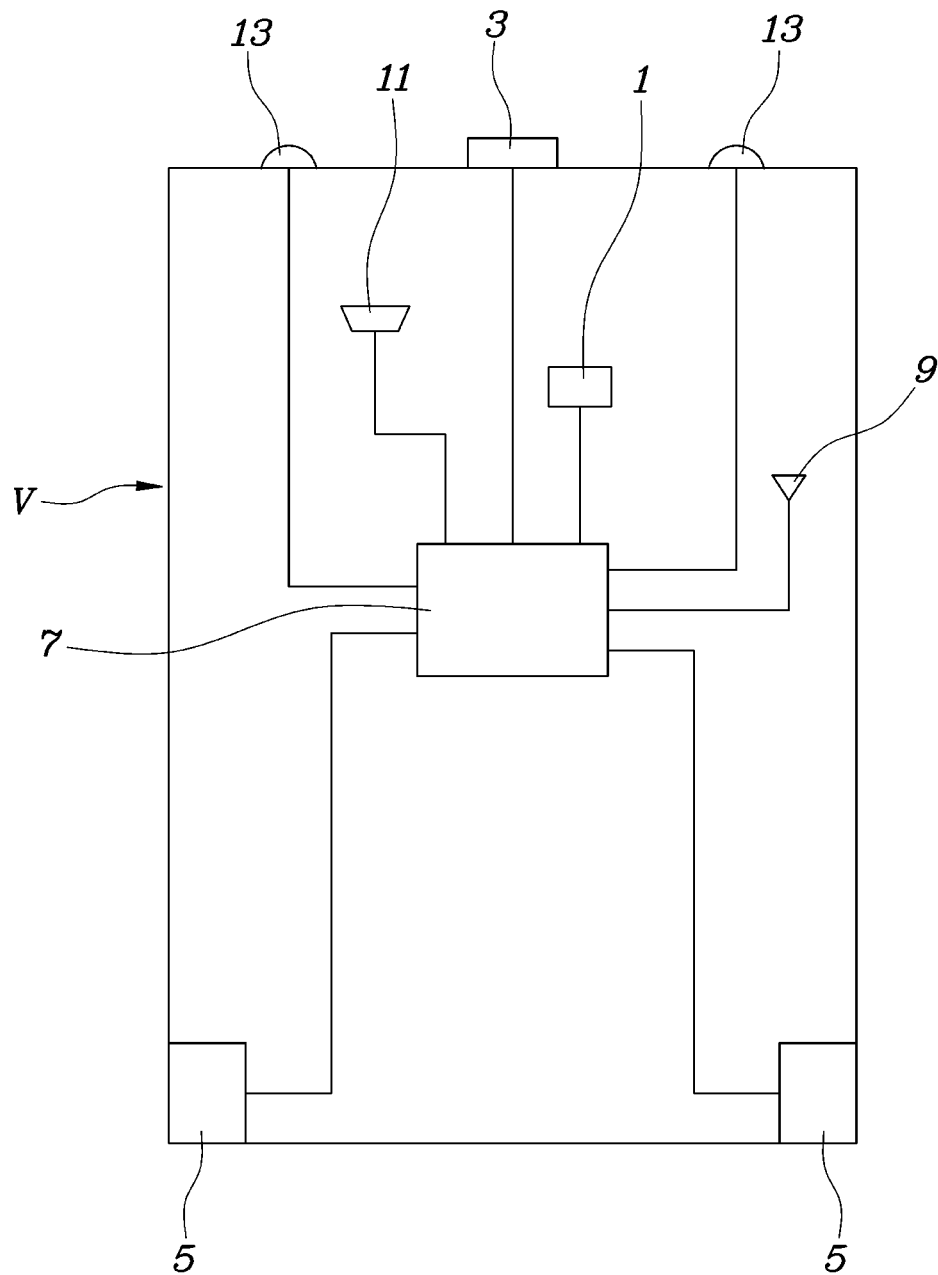
FIG. 1 is a conceptual diagram for describing a vehicle to which a system for controlling vehicle driving at a roundabout according to the present invention is applied.

Specific structural and functional descriptions of embodiments of the present invention disclosed in the present specification or application are illustrated for the purpose of describing embodiments according to the present invention, and embodiments according to the present invention may be implemented in various forms and should not be construed as being limited to the embodiments described in the present specification and application.

While embodiments according to the present invention are susceptible to various modifications and alternative forms, specific embodiments are shown by way of example in the drawings. However, the present invention should not be construed as limited to the embodiments set forth herein, but on the contrary, the present invention is to cover all modifications, equivalents, and alternatives falling within the spirit and scope of the present invention.

The terms "first" and/or "second" are used to describe various components, but such components are not limited by these terms. The terms are used to discriminate one component from another component. For example, a first component may be called a second component and the second component may be called the first component within the technical spirit of the present invention.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components. Further, other representations describing a relationship between components, that is, "between", "immediately between", "adjacent to" and "directly adjacent to" should be construed likewise.

The terms used in the specification of the present invention are merely used in order to describe particular embodiments, and are not intended to limit the scope of the present invention. An element described in the singular form is intended to include a plurality of elements unless the context clearly indicates otherwise. In the specification of the present invention, it will be further understood that the term "comprise" or "include" specifies the presence of a stated feature, figure, step, operation, component, part or a combination thereof, but does not preclude the presence or addition of one or more other features, figures, steps, operations, components, or combinations thereof.

All the terms that are technical, scientific or otherwise agree with the meanings as understood by a person skilled in the art unless defined to the contrary. Common terms as found in dictionaries should be interpreted in the context of the related technical writings not too ideally or impractically unless expressly disclosed herein.

Hereinafter, preferred embodiments of the present invention will be described in detail with reference to the attached drawings. Throughout the drawings, the same reference numerals represent the same members.

Figure 2:
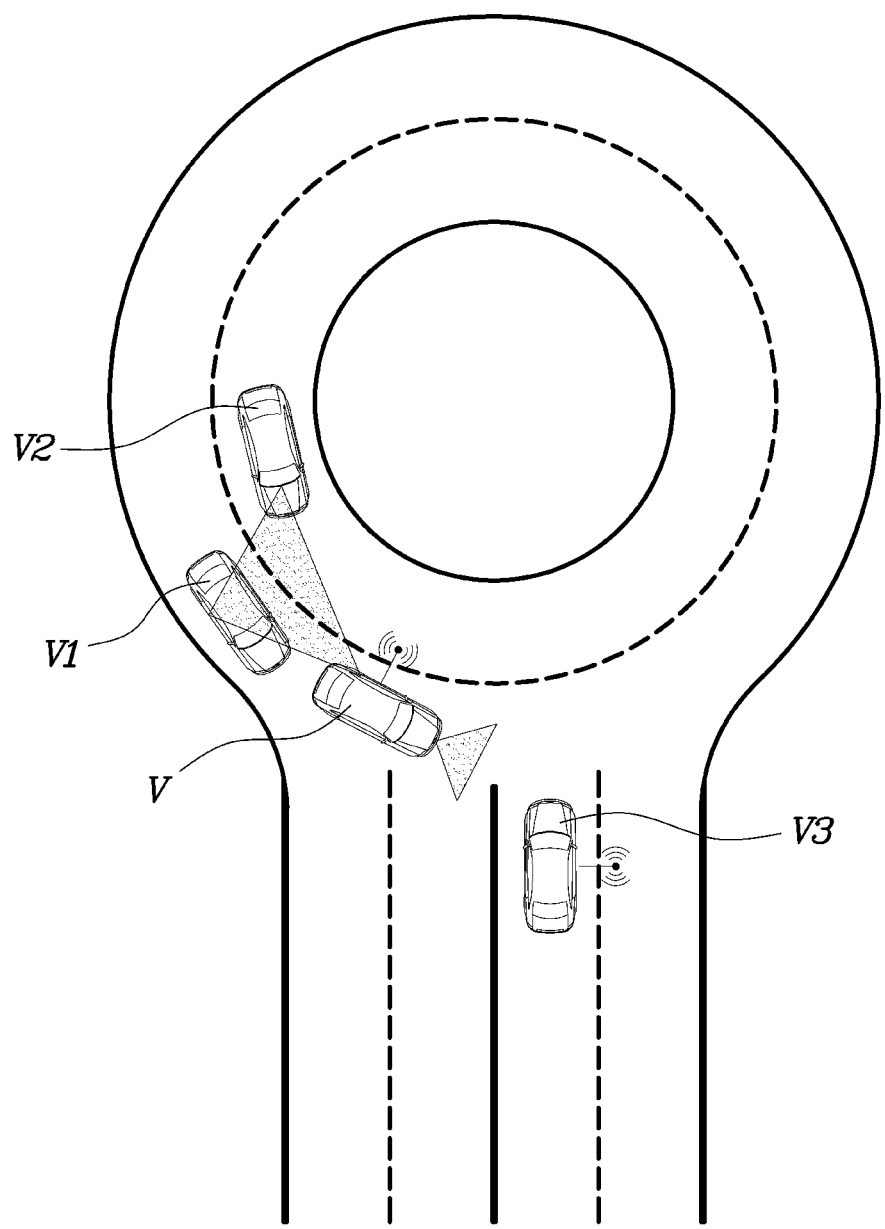
FIG. 2 is a diagram for describing a situation in which the present invention is applied to a vehicle driving through a roundabout.

Referring to FIG. 1 and FIG. 2, a system for controlling vehicle driving through a roundabout according to an embodiment of the present invention includes a position recognition unit 1 (may also be referred to as position recognizer 1) configured to recognize that a vehicle V is traveling around a roundabout, a front sensor 3 provided at the front of the vehicle V to sense a vehicle that possibly enters the roundabout during traveling around the roundabout, a rear sensor 5 provided at the rear of the vehicle to sense vehicles V1 and V2 following the vehicle V traveling around the roundabout, a controller 7 configured to calculate a possible entry time at which a vehicle V3 that possibly enters the roundabout sensed by the front sensor 3 can enter the roundabout using information sensed by the rear sensor 5, and a communication unit 9 (may also be referred to as communicator 9) configured to provide information on the calculated possible entry time to the vehicle V3.

That is, the system for controlling vehicle driving through a roundabout provides information on a possible entry time, calculated in consideration of even information on vehicles V1 and V2 following the host vehicle V traveling around the roundabout, to the vehicle V3 that intends to enter the roundabout such that the vehicle V3 can enter the roundabout upon determining a roundabout entry time accurately and safely, thereby preventing collision that may occur when a vehicle enters a roundabout.

It is desirable that the vehicle V3 that intends to enter the roundabout be configured to receive information from the host vehicle V that provides the possible entry time while traveling around the roundabout to control entry to the roundabout on the basis of the information.

Here, the position recognition unit 1 may be configured to determine that the vehicle V is traveling around a roundabout using global positioning system (GPS) information and navigation information of the vehicle V when GPS position information of the vehicle V indicates that the vehicle V is located at the roundabout in a navigation map.

A device such as a front camera or a front radar may be used as the front sensor 3 and a device such as a rear camera or a rear radar may be used as the rear sensor 5. In addition, an ultrasonic sensor or lidar attached to the front and rear of the vehicle V may be used as the front sensor 3 and the rear sensor 5.

It is desirable that the communication unit 9 be configured as a device capable of performing vehicle-to-vehicle wireless communication using radio waves or the like.

The system for controlling vehicle driving through a roundabout according to an embodiment of the present invention may further include a warning means (may also be referred to as a warning device) configured to warn the vehicle that possibly enters the roundabout, and the controller 7 is configured to drive the warning means to warn the vehicle about danger of entry when the front sensor 3 senses entry of the vehicle to the roundabout before the possible entry time.

Here, the warning means may be configured as a horn 11 of the vehicle which is a kind of auditory warning means (may also be referred to as an auditory warning device) or a headlamp 13 that can be used as visual warning means (may also be referred to as a visual warning device).

That is, when movement of a vehicle intending to enter the roundabout before a possible entry time is detected, the controller 7 can operate the horn 11 or turn on the headlamp 13 to warn the vehicle about danger of entry or may operate both the horn 11 and the headlamp 13 in order to improve the warning effect.

When the vehicle V is warned about danger of entry to the roundabout through the warning means, as described above, the vehicle V3 is prevented from entering the roundabout and thus occurrence of an accident can be prevented.

The controller 7 is configured to determine, as the possible entry time, a latest time among a time at which the host vehicle V is expected to pass through an entry point of the roundabout, a time at which the vehicle V1 following immediately behind the host vehicle V passes through the entry point, and a time at which the vehicle V2 following the host vehicle V on the side passes through the entry point.

Here, a "host vehicle V" means a vehicle to which the present invention is applied and is used to be clearly distinguished from the immediately rear vehicle V1, the side rear vehicle V2, and the vehicle V that possibly enters the roundabout.

Further, "vehicle V3 that possibly enters a roundabout" means both a vehicle approaching an entry point of the roundabout and a vehicle waiting at the entry point.

The times at which the vehicles V1 and V2 are expected to pass through the entry point may be calculated using traveling speeds of the vehicles and distances between the vehicles and the entry point.

Moreover, the controller 7 may be configured to determine the possible entry time by adding a first weight proportional to the radius of the roundabout to the latest time among the time at which the host vehicle V is expected to pass through the entry point of the roundabout, the time at which the vehicle V1 following immediately behind the host vehicle V passes through the entry point, and the time at which the vehicle V2 following the host vehicle V on the side passes through the entry point.

That is, even if straight distances between the vehicles V, V1, and V2 that are traveling around the roundabout and the vehicle V3 that possibly enters the roundabout are identical, a time taken for the corresponding vehicle to arrive at the entry point of the roundabout generally increases as the radius of the roundabout increases. Accordingly, the possible entry time is calculated more accurately in consideration of the first weight.

In addition, the controller 7 may be configured to determine the possible entry time by adding a second weight according to the weather condition of the roundabout in addition to the first weight.

That is, when the weather condition of the roundabout is rain or the night time, times taken for the vehicles V, V1, and V2 that are traveling around the roundabout to arrive at the entry point are highly likely to increase. Accordingly, the possibly entry time is calculated more accurately in consideration of the second weight.

The first weight and the second weight may be determined as appropriate values through various experiments and analyses according to the above-described technical purpose.

Figure 3:
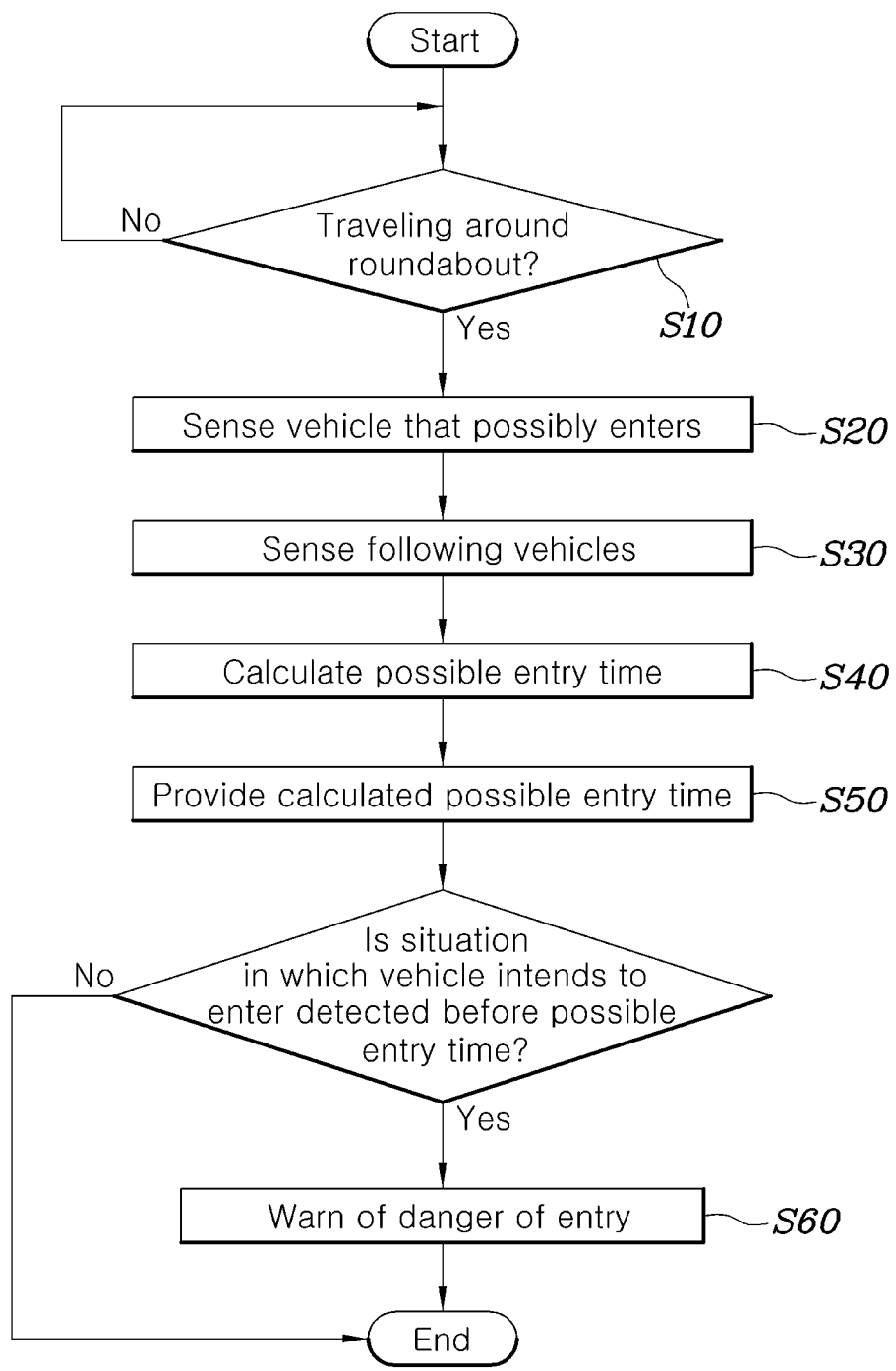
FIG. 3 is a flowchart illustrating an embodiment of a method for controlling vehicle driving through a roundabout according to the present invention.

Referring to FIG. 3, a method for controlling the system for controlling vehicle driving through a roundabout according to the present invention includes a step S10 of determining whether the host vehicle V is traveling around a roundabout, a step S20 of determining whether there is a vehicle V3 that possibly enters the roundabout in front of the host vehicle V if the host vehicle V is traveling around the roundabout, a step S30 of sensing vehicles V1 and V2 following the host vehicle V during traveling around the roundabout, a step S40 of calculating a possible entry time of the vehicle V3 that possibly enters the roundabout using information on the vehicles V1 and V2 following the host vehicle V, and a step S50 of providing the calculated possible entry time to the vehicle V3 that possibly enters the roundabout.

In the step S10 of determining whether the host vehicle V is traveling around the roundabout, it is possible to determine that the host vehicle V is traveling around the roundabout upon determining that GPS position information on the host vehicle V indicates that the host vehicle V is located at the roundabout on a navigation map using GPS information and navigation map information of the host vehicle V.

A step S60 of warning of danger of entry upon sensing entry of the vehicle V3 that possibly enters the roundabout to the roundabout before the calculated possible entry time may be additionally executed.

In the step S60 of warning of danger of entry, it is possible to warn of danger of entry using at least one of a visual warning means and an auditory warning means and a vehicle-to-vehicle communication means (may also be referred to as a vehicle-to-vehicle communication device).

That is, the vehicle that intends to enter the roundabout is warned about a dangerous situation by turning on or off the headlamp 13 that is a visual warning means or operating the horn 11 that is an auditory warning means and, simultaneously, the vehicle is warned about a dangerous situation through a vehicle-to-vehicle wireless communication means.

In the step S40 of calculating the possible entry time of the vehicle V3 that possibly enters the roundabout, a latest time among a time at which the host vehicle V is expected to pass through an entry point of the roundabout, a time at which the vehicle V1 following immediately behind the host vehicle V passes through the entry point, and a time at which the vehicle V2 following the host vehicle V on the side passes through the entry point may be determined as the possible entry time.

Further, in the step S40 of calculating the possible entry time of the vehicle V3 that possibly enters the roundabout, the possible entry time may be determined by adding a first weight proportional to the radius of the roundabout to the latest time among the time at which the host vehicle V is expected to pass through the entry point of the roundabout, the time at which the vehicle V1 following immediately behind the host vehicle V passes through the entry point, and the time at which the vehicle V2 following the host vehicle V on the side passes through the entry point.

Moreover, in the step S40 of calculating the possible entry time of the vehicle V3 that possibly enters the roundabout, the possible entry time may be determined by adding the first weight proportional to the radius of the roundabout and a second weight according to the weather condition of the roundabout to the latest time among the time at which the host vehicle V is expected to pass through the entry point of the roundabout, the time at which the vehicle V1 following immediately behind the host vehicle V passes through the entry point, and the time at which the vehicle V2 following the host vehicle V on the side passes through the entry point.

The position recognizer 1, the communicator 9, and the units, modules, and components that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention can easily and safely achieve autonomous driving of an autonomous vehicle as well as a vehicle driven by a driver at a roundabout and effectively prevent collision between a vehicle that is traveling around a roundabout and a vehicle that intends to enter the roundabout by notifying vehicles that intend to enter the roundabout of an appropriate entry time.

What is claimed is:

1. A system for controlling vehicle driving through a roundabout, comprising:
  a position recognizer configured to recognize that a host vehicle is traveling around the roundabout;
  a front sensor disposed at a front of the host vehicle and configured to sense a vehicle that possibly enters the roundabout while the host vehicle is traveling around the roundabout;
  a rear sensor disposed at a rear of the host vehicle and configured to recognize a vehicle following the host vehicle while the host vehicle is traveling around the roundabout;
  a controller configured to calculate a possible entry time of the vehicle that possibly enters the roundabout, using information sensed by the rear sensor,
    wherein the controller is further configured to determine, as the possible entry time, a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point,
    wherein times at which the vehicle following immediately behind the host vehicle and the vehicle following the host vehicle on a side of the host vehicle are expected to pass through the entry point are calculated using traveling speeds of the vehicles and distances between the vehicles and the entry point; and
  a communicator configured to provide the calculated possible entry time to the vehicle that possibly enters the roundabout.

2. The system according to claim 1, further comprising a warning device configured to warn the vehicle that possibly enters the roundabout,
  wherein the controller is further configured to drive the warning device to warn the vehicle that possibly enters the roundabout about danger of entry, in response to the front sensor sensing entry of the vehicle into the roundabout before the possible entry time.

3. The system according to claim 1, wherein the controller is further configured to determine the possible entry time by adding a first weight proportional to a radius of the roundabout to the latest time among the time at which the host vehicle is expected to pass through the entry point of the roundabout, the time at which the vehicle following immediately behind the host vehicle passes through the entry point, and the time at which the vehicle following the host vehicle on a side of the host vehicle passes through the entry point.

4. The system according to claim 3, wherein the controller is further configured to determine the possible entry time by adding a second weight according to a weather condition of the roundabout to the first weight.

5. A method for controlling vehicle driving through a roundabout, comprising:
   determining whether a host vehicle is traveling around the roundabout;
   determining whether there is a vehicle that possibly enters the roundabout in front of the host vehicle while the host vehicle is traveling around the roundabout;
   sensing a vehicle following the host vehicle while the host vehicle is traveling around the roundabout;
   calculating a possible entry time of the vehicle that possibly enters the roundabout using information on the vehicle following the host vehicle,
   wherein the calculating of the possible entry time of the vehicle that possibly enters the roundabout further comprises:
      determining, as the possible entry time, a latest time among a time at which the host vehicle is expected to pass through an entry point of the roundabout, a time at which a vehicle following immediately behind the host vehicle passes through the entry point, and a time at which a vehicle following the host vehicle on a side of the host vehicle passes through the entry point,
      wherein times at which vehicles are expected to pass through the entry point are calculated using traveling speeds of the vehicles and distances between the vehicles and the entry point; and
   providing the calculated possible entry time to the vehicle that possibly enters the roundabout.

6. The method according to claim 5, wherein the determining of whether the host vehicle is traveling around the roundabout comprises determining that the host vehicle is traveling around the roundabout, in response to determining that GPS position information on the host vehicle indicates that the host vehicle is located at the roundabout on a navigation map using GPS information and navigation map information of the host vehicle.

7. The method according to claim 5, further comprising warning the vehicle that possibly enters the roundabout about danger of entry, in response to sensing entry of the vehicle to the roundabout before the calculated possible entry time.

8. The method according to claim 7, wherein the warning of the vehicle comprises warning about the danger of entry using any one or any combination of any two or more of a visual warning device, an auditory warning device, and a vehicle-to-vehicle communication device.

9. The method according to claim 5, wherein the calculating of the possible entry time comprises determining the possible entry time by adding a first weight proportional to a radius of the roundabout to the latest time among the time at which the host vehicle is expected to pass through the entry point of the roundabout, the time at which the vehicle following immediately behind the host vehicle passes through the entry point, and the time at which the vehicle following the host vehicle on a side of the host vehicle passes through the entry point.

10. The method according to claim 5, wherein the calculating of the possible entry time comprises determining the possible entry time by adding a first weight proportional to a radius of the roundabout and a second weight according to a weather condition of the roundabout to the latest time among the time at which the host vehicle is expected to pass through the entry point of the roundabout, the time at which the vehicle following immediately behind the host vehicle passes through the entry point, and the time at which the vehicle following the host vehicle on a side of the host vehicle passes through the entry point.

11. A non-transitory computer-readable storage medium storing instructions that, when executed by a processor, cause the processor to perform the method of claim 5.

* * * * *